United States Patent

Horn et al.

[11] Patent Number: 5,110,834
[45] Date of Patent: May 5, 1992

[54] PRODUCTION OF CHLOROFLUOROCARBON-FREE URETHANE-CONTAINING SOFT-ELASTIC MOLDINGS HAVING A CELLULAR CORE AND A COMPACTED PERIPHERAL ZONE

[75] Inventors: Peter Horn, Heidelberg; Wolfgang Hoelderich, Frankenthal; Rudolf Taddey, Damme; Dieter Tintelnot, Diepholz, all of Fed. Rep. of Germany

[73] Assignee: BASF Aktiengesellschaft, Ludwigshafen, Fed. Rep. of Germany

[21] Appl. No.: 770,382

[22] Filed: Oct. 3, 1991

[30] Foreign Application Priority Data

Oct. 26, 1990 [DE] Fed. Rep. of Germany ....... 4034082

[51] Int. Cl.⁵ ............... C08J 9/35; C08J 9/38
[52] U.S. Cl. ............... 521/52; 264/DIG. 15; 521/103; 521/106; 521/122; 521/123; 521/124; 521/125
[58] Field of Search ............ 521/106, 52, 122, 124, 521/103, 123, 125; 264/DIG. 15

[56] References Cited

U.S. PATENT DOCUMENTS

| | | | |
|---|---|---|---|
| 4,551,481 | 11/1985 | Smith et al. | 521/110 |
| 4,569,861 | 2/1986 | Smith et al. | 521/110 |
| 4,594,362 | 6/1986 | Smith et al. | 521/76 |

Primary Examiner—Morton Foelak
Attorney, Agent, or Firm—Dennis V. Carmen

[57] ABSTRACT

Chlorofluorocarbon-free urethane-containing, soft-elastic moldings having a cellular core, a compacted peripheral zone and an essentially pore-free smooth surface are produced by reacting a) an organic and/or modified organic polyisocyanate with
b) at least one relatively high-molecular-weight compound containing at least two reactive hydrogen atoms and, if desired,
c) a low-molecular-weight chain extender and/or crosslinking agent, in the presence of d) a blowing agent,
e) a catalyst,
f) a crystalline, microporous molecular sieve having a cavity diameter of less than 1.3 nm and comprising metal oxides or metal phosphates, and, if desired, further additives and
g) assistants, in a closed mold with compaction, expediently by RIM.

19 Claims, No Drawings

PRODUCTION OF CHLOROFLUOROCARBON-FREE URETHANE-CONTAINING SOFT-ELASTIC MOLDINGS HAVING A CELLULAR CORE AND A COMPACTED PERIPHERAL ZONE

The present invention relates to a process for the production of chlorofluorocarbon-free urethane-containing soft-elastic moldings having a cellular core and a compacted peripheral zone with an essentially pore-free smooth surface, known as structural polyurethane (PU) foams, by reacting conventional starting materials for the formation of polyisocyanate polyaddition products in the presence of water and/or a physical blowing agent (with the exception of chlorofluorocarbons) a catalyst, a crystalline, microporous molecular sieve having a cavity and cavity mouth diameter of less than 1.3 nm and comprising metal oxides or metal phosphates, and, if desired, further additives and assistants.

The production of moldings having a cellular core and a compacted peripheral zone by reacting an organic polyisocyanate, a relatively high-molecular-weight compound containing at least two reactive hydrogen atoms and, if desired, a chain extender in the presence of a blowing agent, preferably a physical blowing agent, a catalyst, and assistants and/or additives in a closed, possibly temperature-controlled mold has been known for a long time and is described, for example, in German Laid-Open Application DE-OS 16 94 138 (GB 1,209,243), German Patent DE-PS 19 55 891 (GB 1,321,679) and German Published Application DE-AS 17 69 886 (U.S. Pat. No. 3,824,199).

A review on moldings of this type, known as structural polyurethane foams, has been published, for example, in Kunststoff-Handbuch, Volume 7, Polyurethane, edited by Dr. G. Oertel, Carl-Hanser-Verlag, Munich, Vienna, 2nd Edition, 1983, pages 333ff., and in Integralschaumstoffe by Dr. H. Piechota and Dr. H. Röhr, Carl-Hanser-Verlag, Munich, Vienna, 1975.

Although the production of soft-elastic structural PU foam moldings has achieved extraordinary industrial importance, the processes described have problems due to the increased environmental awareness with respect to the blowing agents used. Worldwide, fluorochloroalkanes, preferably trichlorofluoromethane, are employed on a large scale as blowing agents and first evaporate under the influence of the exothermic polyaddition reaction, then partially condense on the cooler internal surface of the mold at superatmospheric pressure and are included in the moldings. The only disadvantage of these blowing gases is environmental pollution, since they are suspected of participating in the degradation of the ozone layer in the stratosphere.

In order to reduce the amount of fluorochloroalkanes, the blowing agent predominantly used is water, which reacts with the polyisocyanate to form carbon dioxide, which acts as the actual blowing gas. This process has the disadvantage that the carbon dioxide formed does not condense on the internal surface of the mold under the reaction conditions present in the mold and thus results in the formation of moldings having a porous surface.

According to DE-A-1 804 362 (GB 1,285,224), PU foams having a compact surface and a cellular core can be produced in the presence of alkali metal aluminosilicates having a zeolite structure. The blowing agent used is, in particular, a halogenated hydrocarbon or a mixture of halogenated hydrocarbons and partially hydrated alkali metal aluminosilicates or organic compounds containing water of hydration. The addition of water and the alkali metal aluminosilicate is said to give shrinkage-free structural PU foam moldings having overall densities of up to 120 g/l, in spite of the presence of chlorofluorocarbons.

Chlorofluorocarbon-free, rigid PU foam moldings having high surface hardness and a density of at least 300 kg/m$^3$ are described in EP-A-0 319 866 (U.S. Pat. No. 4,882,363). They are produced using polyhydroxyl compounds or a mixture of organic polyhydroxyl compounds having a mean hydroxyl functionality of at least 2.2 and a mean hydroxyl number of at least 300 mg of KOH/G, water and/or carbon dioxide as blowing agent and a zeolite absorbant additive having a diameter of the pore opening to the absorption cavities of at least 0.7 nm.

The abovementioned publications contain no information on the production of soft-elastic structural PU foam moldings having an essentially pore-free, smooth surface, these moldings expediently being produced by reaction injection molding (RIM).

It is an object of the present invention to provide urethane-containing, soft-elastic moldings have a cellular core and a compacted peripheral zone with an essentially pore-free smooth surface without using chlorofluorocarbons. The bubble-free surface of the moldings should have a Shore A hardness which corresponds to that of products foamed using chlorofluorocarbons. PU formulations which are suitable for this purpose should also be readily processable by RIM in the absence of chlorofluorocarbons as diluents.

We have found that, surprisingly, this object is achieved by using a crystalline, microporous molecular sieve having a cavity and cavity mouth diameter of less than 1.3 nm and comprising metal oxides or metal phosphates to produce the soft-elastic structural PU foam moldings.

The present invention accordingly provides a process for the production of chlorofluorocarbon-free urethane-containing soft-elastic moldings having a cellular core and a compacted peripheral zone, by reacting a) an organic and/or modified organic polyisocyanate with b) at least one relatively high-molecular-weight compound containing at least two reactive hydrogen atoms and, if desired, c) a low-molecular-weight chain extender and/or crosslinking agent, in the presence of d) a blowing agent, e) a catalyst, f) additives and, if desired, g) assistants, in a closed mole with compaction, wherein an additive (f) is a crystalline, microporous molecular sieve having a cavity and cavity mouth diameter of less than 1.3 nm and comprising metal oxides or metal phosphates.

In spite of the addition of the molecular sieve comprising metal oxides or metal phosphates and the attendant increase in the viscosity of the components, the latter have very good flow properties and can easily be processed by RIM. The soft-elastic structural PU foam moldings produced have a peripheral zone of relatively high density and a smooth, essentially pore-free and bubble-free surface. The Shore A hardness of the surface and the other mechanical properties correspond to those of structural foam moldings expanded using a chlorofluorocarbon.

The following applies to components (a), (b) and (d) to (f) and, if used, (c) and (g) which can be used for the process according to the invention and to the molecular sieve comprising metal oxides or metal phosphates which is suitable according to the invention:

Suitable organic polyisocyanates (a) are aliphatic, cycloaliphatic, araliphatic and preferably aromatic polyisocyanates.

The following may be mentioned as examples: alkylene diisocyanates having from 40 to 12 carbon atoms in the alkylene moiety, such as 1,12-dodecane diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanate and any desired mixtures of these isomers, 1-isocyanato-3,3,5-trimethyl-5-isocyanatomethylcyclohexane (isophorone diisocyanate), 2,4- and 2,6-hexahydrotolylene diisocyanate, and the corresponding isomer mixtures, 4,4'-, 2,2'- and 2,4'-dicyclohexylmethane diisocyanate and the corresponding isomer mixtures, and preferably aromatic diisocyanates and polyisocyanates, e.g. 2,4- and 2,6-tolylene diisocyanate and the corresponding isomer mixtures, 4,4'-, 2,4'- and 2,2'-diphenylmethane diisocyanate and the corresponding isomer mixtures, mixtures of 4,4'- and 2,4'-diphenylmethane diisocyanates, polyphenyl-polymethylene polyisocyanates, mixtures of 4,4'-, 2,4'- and 2,2'-diphenylmethane diisocyanates and polyphenyl-polymethylene polyisocyanates (crude MDI), and mixtures of crude MDI and tolylene diisocyanates. The organic diisocyanates and polyisocyanates may be employed individually or in the form of mixtures.

Frequently, modified polyisocyanates are also used, i.e. products which are obtained by chemical reaction of organic diisocyanates and/or polyisocyanates. Specific examples are ester-, urea-, biuret-, allophanate-, carbodiimide-, isocyanurate-, uretdione- and/or urethane-containing diisocyanates and/or polyisocyanates. Individual examples are urethane-containing organic, preferably aromatic, polyisocyanates containing from 33.6 to 15% by weight, preferably from 31 to 21% by weight, of NCO, based on the total weight, for example 4,4'-diphenylmethane diisocyanate or 2,4- or 2,6-tolylene diisocyanate modified by means of low-molecular-weight diols, triols, dialkylene glycols, trialkylene glycols or polyoxyalkylene glycols having molecular weights of up to 4200, specific examples of di- and polyoxyalkylene glycols, which can employed individually or as mixtures, being diethylene glycol, dipropylene glycol, polyoxyethylene glycol, polyoxypropylene glycol and polyoxypropylene-polyoxyethylene glycol. NCO-containing prepolymers containing from 25 to 3.5% by weight, preferably from 21 to 14% by weight, of NCO, based on the total weight, and prepared from the polyester- and/or preferably polyether-polyols described below and 4,4'-diphenylmethane diisocyanate, mixtures of 2,4'- and 4,4'-diphenylmethane diisocyanate, 2,4- and/or 2,6-tolylene diisocyanates or crude MDI are also suitable. Furthermore, liquid polyisocyanates containing carbodiimide groups and/or isocyanurate rings and containing from 33.6 to 15% by weight, preferably from 31 to 21% by weight, of NCO, based on the total weight, e.g. based on 4,4'-, 2,4'- and/or 2,2'-diphenylmethane diisocyanate and/or 2,4- and/or 2,6-tolylene diisocyanate, have also proven successful.

The modified polyisocyanates may be mixed with one another or with unmodified organic polyisocyanates, e.g. 2,4'- or 4,4'-diphenylmethane diisocyanate, crude MDI or 2,4- and/or 2,6-tolylene diisocyanate.

Further organic polyisocyanates which have proven particularly successful and are preferred for use for the preparation of the soft-elastic structural polyurethane foams are NCO-containing prepolymers containing from 25 to 9% by weight of NCO, in particular based on polyether- or polyester-polyols and one or more diphenylmethane diisocyanate isomers, advantageously 4,4'-diphenylmethane diisocyanate and/or modified urethane-containing organic polyisocyanates containing from 33.6 to 15% by weight of NCO, in particular based on 4,4'-diphenylmethane diisocyanate or diphenylmethane diisocyanate isomer mixtures, mixtures of 2,4- and 2,6-tolylene diisocyanates, mixtures of tolylene diisocyanates and crude MDI or, in particular, mixtures of the abovementioned prepolymers based on diphenylmethane diisocyanate isomers and crude MDI. The aromatic polyisocyanates, modified aromatic polyisocyanates or polyisocyanate mixtures expediently have a mean functionality of from 2 to 2.6, preferably from 2 to 2.4, in particular from 2 to 2.2.

If, for specific areas of application, moldings having a light-stable surface are required, for example for internal paneling in automobiles or for neck supports, they are preferably produced using aliphatic or cycloaliphatic polyisocyanates, in particular modified polyisocyanates based on hexamethylene 1,6-diisocyanate or isophorone diisocyanate, or mixtures of said diisocyanates, if desired with diphenylmethane diisocyanate and/or tolylene diisocyanate isomers.

The relatively high-molecular-weight compound (b) containing at least two reactive hydrogen atoms expediently has a functionality of from 2 to 4, preferably from 2 to 3, in particular from 2.0 to 2.6, and a molecular weight of from 1200 to 8500, preferably from 1800 to 6000, in particular from 2000 to 5000. Particular success has been achieved using polyols selected from the group comprising the polyether-polyols, polyester-polyols, polythioether-polyols, hydroxyl-containing polyester-amides, hydroxyl-containing polyacetals, hydroxyl-containing aliphatic polycarbonates and polymer-modified polyether-polyols, or mixtures of at least two of said polyols. Particular preference is given to polyester-polyols and/or polyether-polyols.

Suitable polyester-polyols may be prepared, for example, from organic dicarboxylic acids having from 2 to 12 carbon atoms, preferably aliphatic dicarboxylic acids having from 4 to 6 carbon atoms and polyhydric alcohols, preferably diols, having from 2 to 12 carbon atoms, preferably from 2 to 6 carbon atoms. Examples of suitable dicarboxylic acids are succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids may be used either individually or mixed with one another. The free dicarboxylic acids may also be replaced by the corresponding dicarboxylic acid derivatives, for example dicarboxylic acid mono- and/or diesters of alcohols having 1 to 4 carbon atoms or dicarboxylic anhydrides. Preference is given to dicarboxylic acid mixtures comprising succinic acid, glutaric acid and adipic acid in ratios of, for example, from 20 to 35: 35 to 50: 20 to 32 parts by weight, and in particular adipic acid. Examples of dihydric and polyhydric alcohols, in particular diols or alkylene glycols, are ethanediol, diethylene glycol, 1,2- and 1,3-propanediol, dipropylene glycol, 1,4-butanediol, 1,5-pentanediol, 1,6-hexanediol, 1,10-decanediol, glycerol and trimethylolpropane. Preference is given to ethanediol, diethylene glycol, 1,4-butanediol, 1,5-pentanediol, 1,6-hexanediol and mixtures of at least two of said diols, in particular mixtures of 1,4-butanediol, 1,5-pentanediol and 1,6-hexanediol. Furthermore, polyester-polyols made from lactones, e.g. ε-caprolactone or hydroxycarboxylic acids, e.g. ω-hydroxycaproic acid, may also be employed.

The polyester-polyols may be prepared by polycondensing the organic, e.g. aromatic and preferably aliphatic polycarboxylic acids and/or derivatives thereof and polyhydric alcohols without using a catalyst or preferably in the presence of an esterification catalyst, expediently in an inert gas atmosphere, e.g. nitrogen, carbon monoxide, helium, argon, inter alia, in the melt at from 150° to 250° C., preferably from 180° to 220° C., at atmospheric pressure or under reduced pressure until the desired acid number, which is advantageously less than 10, preferably less than 2, is reached. In a preferred embodiment, the esterification mixture is polycondensed at the abovementioned temperatures under atmospheric pressure and subsequently under a pressure of less than 500 mbar, preferably from 50 to 150 mbar, until an acid number of from 80 to 30, preferably from 40 to 30, has been reached. Examples of suitable esterification catalysts are iron, cadmium, cobalt, lead, zinc, antimony, magnesium, titanium and tin catalysts in the form of metals, metal oxides or metal salts. However, the polycondensation may also be carried out in the liquid phase in the presence of diluents and/or entrainers, e.g. benzene, toluene, xylene or chlorobenzene, for removal of the water of condensation by azeotropic distillation.

The polyester-polyols are advantageously prepared by polycondensing the organic polycarboxylic acids and/or derivatives thereof with polyhydric alcohols in a molar ratio of from 1:1 to 1.8, preferably from 1:1.05 to 1.2.

The polyester-polyols obtained preferably have a functionality of from 2 to 3, in particular from 2 to 2.6, and a molecular weight of from 1200 to 3600, preferably from 1500 to 3000, in particular from 1800 to 2500.

However, the preferred polyols are polyetherpolyols prepared by conventional processes, for example by anionic polymerization using alkali metal hydroxides, such as sodium hydroxide or potassium hydroxide, or alkali metal alkoxides, such as sodium methoxide, sodium ethoxide, potassium ethoxide or potassium isopropoxide as catalysts and with addition of at least one initiator molecule containing from 2 to 4, preferably 2 or 3, reactive hydrogen atoms in bound form, or by cationic polymerization using Lewis acids, such as antimony pentachloride, boron fluoride etherate, inter alia, or bleaching earth as catalysts, from one or more alkylene oxides having from 2 to 4 carbon atoms in the alkylene moiety.

Examples of suitable alkylene oxides are tetrahydrofuran, 1,3-propylene oxide, 1,2- and 2,3-butylene oxide, styrene oxide and preferably ethylene oxide and 1,2-propylene oxide. The alkylene oxides may used individually, alternatively one after the other or as mixtures. Examples of suitable initiator molecules are water, organic dicarboxylic acids, such as succinic acid, adipic acid, phthalic acid and terephthalic acid, aliphatic and aromatic, unsubstituted or N-mono-, N,N- and N,N'-dialkyl-substituted diamines having from 1 to 4 carbon atoms in the alkyl moiety, such as unsubstituted or mono- or dialkyl-substituted ethylenediamine, 1,3-propylenediamine, 1,3- and 1,4-butylenediamine, 1,2-, 1,3-, 1,4-, 1,5- and 1,6-hexamethylenediamine, phenylenediamines, 2,3-, 2,4- and 2,6-tolylenediamine and 4,4'-, 2,4'- and 2,2,-diaminodiphenylmethane.

Other suitable initiator molecules are alkanolamines, e.g. ethanolamine, N-methyl- and N-ethylethanolamine, dialkanolamines, e.g. diethanolamine, N-methyl- and N-ethyl-diethanolamine, and trialkanolamines, e.g. triethanolamine, and ammonia. Preference is given to polyhydric alcohols, in particular dihydric and/or trihydric alcohols, such as ethanediol, 1,2- and 1,3-propanediol, diethylene glycol, dipropylene glycol, 1,4-butanediol, 1,6-hexanediol, glycerol, trimethylolpropane and pentaerythritol The polyether-polyols, preferably polyoxypropylene- and polyoxypropylene-polyoxyethylene-polyols, have a functionality of, preferably, 2 to 3, in particular 2.0 to 2.6, and molecular weights of from 1800 to 8500, preferably from 2200 to 6000, in particular from 2800 to 4200 and suitable polyoxytetramethylene glycols have a molecular weight of up to approximately 3500, preferably from 1200 to 2200.

Other suitable polyether-polyols are polymer-modified polyether-polyols, preferably graft polyether-polyols, in particular those based on styrene and/or acrylonitrile and prepared by in situ polymerization of acrylonitrile, styrene or preferably mixtures of styrene and acrylonitrile, for example in a weight ratio of from 90:10 to 10:90, preferably from 70:30 to 30:70, expediently in the abovementioned polyether-polyols by a method similar to that of German Patents 11 11 394, 12 22 669 (U.S. Pat. Nos. 3,304,273, 3,383,351 and 3,523,093), 11 52 536 (GB 1,040,452) and 11 52 537 (GB 987,618), and polyether-polyol dispersions which contain, as the disperse phase, usually in an amount of from 1 to 50% by weight, preferably from 2 to 25% by weight, for example polyureas, polyhydrazides, polyurethanes containing tert-amino groups in bound form, and/or melamine and are described, for example, in EP-B-011 752 (U.S. Pat. No. 4,304,708), U.S. Pat. No. 4,374,209 and DE-A-32 31 497.

Like the polyester-polyols, the polyether-polyols can be used individually or in the form of mixtures. Furthermore, they may be mixed with the polymer-modified polyether-polyols or polyester-polyols and the hydroxylcontaining polyester-amides, polyacetals and/or polycarbonates.

Examples of suitable hydroxyl-containing polyacetals are the compounds which can be prepared from glycols, such as diethylene glycol, triethylene glycol, 4,4'-dihydroxyethoxydiphenyldimethylmethane, hexanediol and formaldehyde. Suitable polyacetals can also be prepared by polymerizing cyclic acetals.

Suitable hydroxyl-containing polycarbonates are those of a conventional type, which can be prepared by reacting diols, such as 1,3-propanediol, 1,4-butanediol and/or 1,6-hexanediol, diethylene glycol, trioxyethylene glycol or tetraoxyethylene glycol, with diaryl carbonates, e.g. diphenyl carbonate, or phosgene.

The hydroxyl-containing polyester-amides include, for example, the predominantly linear condensates obtained from polybasic, saturated and/or unsaturated carboxylic acids or anhydrides thereof and polyhydric, saturated and/or unsaturated amino alcohols, or mixtures of polyhydric alcohols and amino alcohols and/or polyamines.

The urethane-containing soft-elastic moldings having a compacted peripheral zone and a cellular core may be prepared with or without the use of chain extenders and/or crosslinking agents (c). However, it may prove advantageous, in order to modify the mechanical properties, for example the hardness, to add chain extenders, crosslinking agents or, if desired, mixtures thereof. The chain extenders and/or crosslinking agents used are low-molecular-weight polyhydric alcohols, preferably diols and/or triols, having a molecular weight of less than 480, preferably from 60 to 300. Examples are aliphatic, cycloaliphatic and/or araliphatic diols having from 2 to 14 carbon atoms, preferably from 4 to 10 carbon atoms, e.g. ethylene glycol, 1,3-propanediol, 1,10-decanediol, o-, m- and p-dihydroxycyclohexane, diethylene glycol, dipropylene glycol and preferably 1,3-butanediol, 1,4-butanediol, 1,6-hexanediol and bis(2-hydroxyethyl)hydroquinone, triols, such as 1,2,4- and 1,3,5-trihydroxycyclohexane, trimethylolethane, glycerol and trimethylolpropane, and low-molecular-weight hydroxyl-containing polyalkylene oxides, e.g. having a molecular weight of up to 480, based on ethylene oxide and/or 1,2-propylene oxide, and the above-mentioned diols and/or triols as initiator molecules.

Particular preference is given to ethylene glycol, 1,3-butanediol, 1,4-butanediol, 1,6-hexanediol and mixtures of at least two of said diols.

If the compounds of component (c) are used, they can be employed in the form of mixtures or individually and are advantageously used in amounts of from 1 to 40 parts by weight, preferably from 5 to 20 parts by weight, based on 100 parts by weight of the relatively high-molecular-weight compounds (b).

The relatively high-molecular-weight compound containing at least 2 reactive hydrogen atoms (b) or the mixture of (b) and a low-molecular-weight chain extender and/or crosslinking agent (c) for the production of the soft-elastic structural PU foam moldings has a hydroxyl number of less than 300 mg of KOH/g, preferably less than 280 mg of KOH/g, in particular from 28 to 200 mg of KOH/g.

The blowing agent (d) used is preferably water, which reacts with the organic, modified or unmodified polyisocyanate (a) to form carbon dioxide and urea groups and thereby affects the compressive strengths of the end products. Since the amount of water present in the crystalline, microporous molecular sieve comprising metal oxides or metal phosphates according to the invention is usually sufficient, there is frequently no need for a separate addition of water. If, however, the water must additionally be introduced into the polyurethane formulation to achieve the desired density, it is usually used in amounts of from 0.05 to 5% by weight, preferably from 0.1 to 3% by weight, in particular from 0.1 to 1% by weight, based on the weight of components (a) to (c).

If calcined molecular sieve is used, the addition of water or of a physical blowing agent is absolutely necessary.

The blowing agent (d) used may, instead of water, or preferably in combination with water and the molecular sieve comprising metal oxides and metal phosphates which is suitable according to the invention, also be a low-boiling liquid which evaporates under the influence of the exothermic polyaddition reaction and advantageously has a boiling point at atmospheric pressure in the range from $-40°$ to $120°$ C., preferably form $10°$ to $90°$ C., or a gas.

The liquids of the abovementioned type and the gases which are suitable as blowing agents can be selected, for example, from the group comprising the alkanes, e.g. propane, n- and isobutane, n- and isopentane and preferably technical-grade pentane mixtures, cycloalkanes, e.g. cyclobutane, cyclopentene, cyclohexene and preferably cyclopentane and/or cyclohexane, dialkyl ethers, e.g. dimethyl ether, methyl ethyl ether or diethyl ether, cycloalkylene ethers, e.g. furan, ketones, e.g. acetone and methyl ethyl ketone, carboxylates, such as ethyl acetate and methyl formate, carboxylic acids, such as formic acid, acetic acid and propionic acid, fluoroalkanes, which are degraded in the troposphere and are therefore benign to the ozone layer, e.g. trifluoromethane, difluoromethane, difluoroethane, tetrafluoroethane and heptafluoroethane, and gases, e.g. nitrogen, carbon monoxide and noble gases, e.g. helium, neon and krypton.

The most expedient amount of low-boiling liquid and gases, which may in each case be employed individually as liquid or gas mixtures or as gas/liquid mixtures, depends on the density desired and on the amount of molecular sieve or molecular sieve and water employed. The amount necessary can easily be determined by simple preliminary experiments. Satisfactory results are usually given by amounts of from 0.5 to 20 parts by weight, preferably from 2 to 10 parts by weight, of liquid and from 0.01 to 30 parts by weight, preferably from 2 to 20 parts by weight, of gas, in each case based on 100 parts by weight of component (b) and, if used, (c).

As stated above, perfluorochlorocarbons are not used as the blowing agent.

The catalysts (e) used to produce the moldings having a compacted peripheral zone and a cellular core are, in particular, compounds which greatly accelerate the reaction of the hydroxyl-containing compounds of component (b) and, if used, (c) with the organic, modified or unmodified polyisocyanate (a). Suitable compounds are organometallic compounds, preferably organotin compounds, such as tin(II) salts of organic carboxylic acids, e.g. tin(II) diacetate, tin(II) dioctanoate, tin(II) diethylhexanoate and tin(II) dilaurate, and dialkyltin(IV) salts of organic carboxylic acids, e.g. dibutyltin diacetate, dibutyltin dilaurate, dibutyltin maleate and dioctyltin diacetate. The organometallic compounds are employed alone or, preferably, in combination with highly basic amines, for example amidines, such as 2,3-dimethyl-3,4,5,6-tetrahydropyrimidine, tertiary amines, such as triethylamine, tributylamine, dimethylbenzyl-amine, N-methyl-, N-ethyl-, N-cyclohexylmorpholine, N,N,N',N'-tetramethylethylenediamine, N,N,N',N'-tetramethylbutanediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane and, preferably, 1,4-diazabicyclo[2.2.2]octane and alkanolamine compounds such as triethannolamine, triisopropanolamine, N-methyl- and N-ethyldiethanolamine and dimethylethanolamine.

Suitable catalysts, in particular if a large excess of polyisocyanate is used, are tris(dialkylaminoalkyl)-s-hexahydrotriazines, in particular tris(N,N-dimethylaminopropyl)-s-hexahydrotriazine, tetraalkylammonium hydroxides, such as tetramethylammonium hydroxide, alkali metal hydroxides, such as sodium hydroxide, and alkali metal alkoxides, such as sodium methoxide and potassium isopropoxide, and alkali metal salts of long-chain fatty acids having from 10 to 20 carbon atoms and possibly containing lateral OH groups. From 0.001 to 5% by weight, in particular from 0.05 to 2% by weight of catalyst or catalyst combination is preferably used, based on the weight of component (b).

The essential feature of the present invention is the use, as an additive (f), of a crystalline, microporous molecular sieve having a cavity and cavity mouth diameter of less than 1.3 nm, e.g. less than from 1.3 nm to 0.3 nm, preferably from 0.74 to 0.41 nm, in particular from 0.7 to 0.51 nm, particularly preferably from 0.68 to 0.51 nm, and comprising metal oxides or metal phosphates. These numerical values have been published in the Atlas of Zeolite Structure Types, W. M. Meier and D. H. Olson, 2nd Revised Edition, Butterworths, London 1987 (published on behalf of the Structure Commission of the International Zeolite Association).

Crystalline, microporous molecular sieves are described in numerous patents and other publications. Molecular sieves comprising metal oxides include, for example, zeolites, e.g. zeolites with small, medium-sized and large pores.

Zeolites are crystalline aluminosilicates which have a highly ordered structure with a rigid three-dimensional network of $SiO_4$ and $AlO_4$ tetrahedra connected by common oxygen atoms. The ratio between silicon and aluminum atoms on the one hand and oxygen on the other hand is 1:2.

The electrovalency of the aluminum-containing tetrahedra is balanced by the inclusion of cations in the crystal, e.g. alkali metal or hydrogen ions. Cation exchange is possible. The spaces between the tetrahedra are occupied by water molecules before dehydration by drying or calcination. In the zeolite lattice, the aluminum may also be replaced by other elements, such as boron, iron, chromium, antimony, arsenic, gallium, vanadium or beryllium or the silicon may be replaced by a tetravalent element, such as germanium, titanium, zirconium or hafnium.

Suitable metal oxides are thus mixed oxides, expediently essentially comprising aluminum/silicon oxide, boron/silicon oxide, iron/silicon oxide, gallium/silicon oxide, chromium/silicon oxide, beryllium/silicon oxide, vanadium/silicon oxide, antimony/silicon oxide, arsenic/silicon oxide, titanium/silicon oxide, aluminum/germanium oxide and boron/germanium oxide, and a molecular sieve containing only silicon dioxide.

Zeolites are divided into various groups in accordance with their structure. Thus, the zeolite structure is formed in the mordenite group by chains or in the chabazite group by layers of tetrahedra, while, in the faujasite, the tetrahedra are arranged to form polyhedra, e.g. in the form of a cuboctahedron built up from 4- or 6-membered rings. Depending on the way in which the cuboctahedra are linked, giving cavities of various size, a distinction is made between type A, L, X and Y zeolites. Zeolites are described, for example, in Molecular Sieve Zeolites-I, Advances in Chemistry Series 101 (American Chemical Society, Washington D.C. 1971), Ullmanns Encyklopädie der technischen Chemie, 4th Edition, 1979, Volume 17, pages 9 ff (Verlag Chemie, Weinheim, N.Y.), and Chem. Rev. 1988, 88, 149-182.

Zeolites which are suitable for the process according to the invention have, in particular, an $SiO_2:Al_2O_3$ ratio of greater than or equal to 4, preferably greater than or equal to 6 and in particular greater than or equal to 10.

Examples of suitable zeolites are zeolites with narrow pores such as ZK-5, erionite and chabazite, zeolites with medium-sized pores, such as pentasil zeolites, theta-1-zeolite, theta-2-zeolite and EU-1, and zeolites with large pores, such as X-zeolite, Y-zeolite, mordenite, offretite, beta-zeolite, omega-zeolite, L-zeolite and faujasite (Angewandte Chemie 100 (1988), 232-251).

This group of zeolites also includes the ultrastable zeolites, e.g. of the faujasite type, i.e. dealuminated Y-zeolites, whose preparation is described, for example, in U.S. Pat. No. 4,512,961, and ultrastable mordenite (H. K. Beyer and I. Belenykaja, Catalysis by Zeolites, Studies in Surface Science and Catalysis, 5 (1980), pages 203 to 209 and I. M. Newsam, Science, Vol. 231 (1986), page 1094)

It is also possible and preferable to use pentasil zeolites with medium-sized pores in the process according to the invention. The basic unit common to these is a 5-membered ring built up from $SiO_4$ tetrahedra and they have a very high $SiO_2:Al_2O_3$ ratio (G. T. Kokotailo and W. M. Meier, Spec. Publ. Chem. Soc. 33 (1980), page 133).

Since zeolites of this type can have varying compositions, the term isomorphically substituted zeolites is used. these are aluminum, boron, iron, chromium, antimony, arsenic, gallium, germanium, titanium, beryllium and bismuth silicate zeolites or mixtures thereof and aluminum, boron, gallium and iron germanate zeolites or mixtures thereof (M. Thielen et al., Proceedings of Int. Symp. on Zeolite Catalysis ZEOCAT Symp. Siofak, Hungary, May 13-16, 1985, pages 1 to 19).

Aluminum, boron, gallium and iron silicate zeolites of the pentasil type having an ellipsoidal cavity diameter of approximately 0.56 nm x 0.53 nm and 0.55 nm $\times$ 0.51 nm (I. M. Newsam, Science, Vol. 231 (1986), page 1095) have proven particularly successful and are therefore preferred. The particularly suitable aluminosilicate zeolite can be prepared, for example, from an aluminum compound, preferably aluminum hydroxide or aluminum sulfate, and a silicon compound, preferably highly disperse silicon dioxide, in an aqueous amine solution, in particular in a polyamine solution, e.g. in a 1,6-hexanediamine, 1,3-propanediamine or triethylenetetramine solution, with or without addition of a basic alkali metal salt or alkaline earth metal salt, at from 100° to 220° C. under autogenous pressure. This group also includes crystalline isotactic zeolites, as described in DE-A-30 06 471 (U.S. Pat. No. 4,401,637). Depending on the amounts of starting materials chosen, the aluminosilicate zeolites which are suitable according to the invention have a $SiO_2:Al_2O_3$ ratio of from 10 to 40,000, preferably from 30 to 20,000. These aluminosilicate zeolites can also be synthesized in an ether medium, such as diethylene glycol dimethyl ether, in an alcohol medium, e.g. methanol or 1,4-butanediol, or in water. Borosilicate zeolites which can be used according to the invention can be synthesized, for example, at from 9° to 200° C. under autogenous pressure by reacting a boron compound, for example $H_3BO_3$, with a silicon compound, preferably highly disperse silicon dioxide, in an aqueous amine solution, in particular an aqueous 1,6-hexanediamine, 1,3-propanediamine or triethylenetetramine solution, in the presence or absence of a basic alkali metal salt or alkaline earth metal salt, it also being possible to replace the aqueous amine solution by an ether solution, e.g. diethylene glycol dimethyl ether solution, or an alcohol solution, e.g. a 1,6-hexanediol solution. The iron silicate zeolites which are suitable according to the invention can also be prepared by a similar method using iron compounds. e.g. iron(III) sulfate.

The silicon-rich zeolites which can be used according to the invention, i.e. zeolites have an $SiO_2:Al_2O_3$ ratio of greater than or equal to 4, preferably greater than or equal to 6, in particular greater than or equal to 10, also include the following types:

ZSM-5, a crystalline aluminosilicate zeolite with an $SiO_2:Al_2O_3$ ratio of greater than 10 and ellipsoidal cavity diameters of 0.56×0.53 nm and 0.55×0.51 nm, whose preparation, for example, is described, in DE-B-17 92 783 (U.S. Pat. No. 3,702,886), ZSM-8, a crystalline zeolite whose characteristic data and a process for whose preparation are published in GB-A-1, 334,243, ZSM-11, likewise a crystalline aluminosilicate zeolite whose characteristic data and preparation are described in U.S. Pat. No. 3,709,979, ZSM-12, a crystalline aluminosilicate zeolite whose structure and preparation are disclosed in U.S. Pat. No. 3,832,449 and Zeolites 5 (1985) 346, ZSM-21, a crystalline aluminosilicate zeolite whose characteristic data and preparation are described in U.S. Pat. No. 4,046,859, ZSM-22, a crystalline zeolite which is known from the publications of G. T. Kokotailo et al., Zeolites 5 (1985), page 349, and A. Araya et al. Zeolites 4 (1984), page 280, ZSM-23, a crystalline aluminosilicate zeolite which is described in U.S. Pat. No. 4,076,842, ZSM-25, a crystalline aluminosilicate zeolite containing from 6 to 10 $SiO_2$ units per $Al_2O_3$ unit which is known from U.S. Pat. No. 4,247,416, ZSM-34, a crystalline aluminosilicate zeolite whose characteristic data and preparation are published in U.S. Pat. No. 4,086,186, ZSM-35, a crystalline aluminosilicate zeolite whose preparation is described in U.S. Pat. No. 4,016,245 and U.S. Pat. No. 4,107,195, ZSM-38, a crystalline aluminosilicate zeolite which is disclosed in U.S. Pat. No. 4,046,859.

ZSM-48, a crystalline aluminosilicate zeolite which is described in U.S. Pat. No. 4,448,675 and U.S. Pat. No. 4,397,827 and ZSM-50, a crystalline aluminosilicate zeolite which is disclosed in U.S. Pat. No. 4,537,754.

Furthermore, it is also possible to use according to the invention ferrierite, a crystalline aluminosilicate zeolite having an $SiO_2:Al_2O_3$ ratio of greater than or equal to 10 and ellipsoidal cavity diameter of 0.54×042 nm, whose preparation is described in EP-A-012 473, and preferably silicalites, crystalline silicon dioxides whose characteristic data and a process for whose preparation are described, for example, in DE-B-2 751 443 (U.S. Pat. No. 4,061,724), EP-A-64 372, EP-A-93 476 and EP-A-123 060. These silicates have a pentasil structure.

Other suitable metal oxides are titanium silicates having a pentasil structure, e.g. TS-1, which are described, for example, by B. Kraushaar and J. H. C. van Hooff (Catalysis Letters 1 (1988), pages 81-84) and G. Perego et al. (Stud. Surf. Sci. Catalysis 28 (1986), pages 129-136), and ETS Molecular Sieves, e.g. ETS-1, ETS-4, and ETS-10. Suitable ETS molecular sieves are disclosed, for example, in U.S. Pat. No. 4,853,202 and ZA 88 09 457.

The aluminosilicate, borosilicate, gallium silicate, titanium silicate and iron silicate zeolites which can be used according to the invention can, after being isolated, be dried at 100° to 160° C., preferably at approximately 110° C., and calcined at from 450° to 500° C., preferably at approximately 500° C.

If, due to the preparation process used, the zeolites are not in the acidic H form, but instead in the salt form, for example the Na or K forms, they can be converted, partially or completely, into the desired H form by ion exchange, e.g. with ammonium ions, and subsequent calcination or treatment with acids. Preferred metal oxides for the process according to the invention are zeolites in the H form or ammonium form. The zeolites may furthermore be doped with transition metals, e.g. iron manganese, cobalt, tungsten or molybdenum, noble metals e.g. copper or silver, and rare-earth metals e.g. lanthanum or cerium, or treated with mineral acids e.g. sulfuric acid, phosphoric acid or hydrofluoric acid.

Preferred metal oxides are mordenite in the H, Na or ammonium form, expediently having a cavity diameter of 0.65×0.7 nm, offretite in the K, Na, ammonium or H form, expediently having a cavity diameter of 0.68×0.67 nm, zeolite ZSM-5 in the H, Na or ammonium form, having a cavity diameter of 0.53×0.56 nm or 0.55×0.51 nm, zeolite ZSM-11 in the Na or ammonium form, having a cavity diameter of 0.54×0.53 nm, zeolite ZSM-12, having a cavity diameter of 0.62×0.57×0.55 nm and having the formula

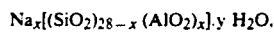

$$Na_x[(SiO_2)_{28-x}(AlO_2)_x] \cdot y\ H_2O.$$

where x<2.5 and y<4, with the proviso that the where zeolite can also be in the H form, clinoptilolite, ferrierite, ultrastable Y-zeolite, ultrastable mordenite in the H or Na form or silicalites, and mixtures of at least 2 of said zeolites. The cavity diameters are described, for example, by I. M. Newsam in Science, Vol. 231 (1986), page 1095, and in the Atlas of Zeolite Structure Types, by W. M. Meier and D. H. Olson (2nd revised edition, Butterworths, London, 1987).

Suitable additives (f) are also crystalline, microporous molecular sieves having a cavity and cavity mouth diameter of less than 1.3 nm and comprising metal phosphates. Preference is given to substituted or unsubstituted aluminum phosphates or silicon/aluminum phosphates, which may additionally contain the elements lithium, beryllium, boron, magnesium, gallium, germanium, arsenic, titanium, manganese, iron, cobalt or zinc. Also suitable are, for example, silicon/iron/aluminum phosphates, cobalt/aluminum phosphates, cobalt-/silicon/aluminum phosphates or mixtures thereof. Metal phosphates of the abovementioned type which are suitable as an additive (f) are described, for example, by E. Flanigan in Pure and Applied Chemistry, Vol. 58 (1986), No. 10, pages 1351 to 1358, by I. M. Bennett et al. in Stud. Surf. Sci. Catalysis 37 (1988), page 269, by P. I. Grobet et al., Studies in Surface Science and Catalysis, Vol. 37 (1988), pages 13 to 27, and in EP-A-158-977, EP-A-161 489, EP-A-161 490 and EP-A-251 168.

Particularly suitable aluminum phosphates are products synthesized under hydrothermal conditions, such as $AlPO_4$-5, $AlPO_4$-9, $AlPO_4$-11, $AlPO_4$-12, $AlPO_4$-14, $AlPO_4$-21, $AlPO_4$-25, $AlPO_4$-31, $AlPO_4$-33, $AlPO_4$-37, $AlPO_4$-40, $AlPO_4$-46, $AlPO_4$-54, VPI-5, whose cavity is formed by 18 tetrahedra and has a diameter of 0.12 nm, and MCM-9. The preparation of the products is described in. EP-A-132 708, U.S. Pat. No. 4,310,440 and U.S. Pat. No. 4,473,663.

To prepare, for example. AlPO₄-5, orthophosphoric acid is mixed homogeneously with pseudoboehmite (Catapal SB®) in water, tetrapropylammonium hydroxide is added to this mixture, and the mixture is allowed to react at approximately 150° C. under autogenous pressure for from 20 to 60 hours in an autoclave. The AlPO formed is then filtered off, dried at from 100° to 160° C. and calcined at 450° to 500° C.

AlPO₄-9 is likewise synthesized from orthophosphoric acid and pseudoboehmite, but in an aqueous 1,4-diazabicyclo[2.2.2]octane solution, at approximately 200° C. under autogenous pressure for from 200 to 400 hours. If the 1,4-diazabicyclo[2.2.2]octane is replaced by ethylenediamine, AlPO₄-12 is obtained. AlPO₄-21 is obtained in a similar manner in the presence of an aqueous pyrrolidone solution.

Suitable silicon/aluminum phosphates are, in particular the products synthesized under hydrothermal conditions, SAPO-5, SAPO-11, SAPO-20, SAPO-31, SAPO-34, SAPO-37, SAPO-41 and SAPO-46.

The structures and the compositions of some of the AlPO and SAPO products are described in Atlas of Zeolite Structure Types, W. M. Meier and D. H. Olson.

Silicon/aluminum phosphates of this type can be prepared, for example, by reacting compounds of silicon, aluminum and phosphorus in an aqueous aminoorganic solution and allowing the product to crystallize out at from 100° to 250° C. under autogenous pressure for approximately 2 hours to approximately 2 weeks.

For example, SAPO-5 can be prepared in accordance with EP-A-251 168 by mixing a suspension of silicon dioxide in an aqueous tetrapropylammonium hydroxide solution with an aqueous suspension of pseudoboehmite and orthophosphoric acid, and subsequently reacting the mixture at from 150° to 200° C. for from 20 to 200 hours under autogenous pressure in a stirred autoclave. The silicon/aluminum phosphate is crystallized, filtered off, dried at from 110° to 160° C. and calcined at from 450° to 550° C.

Silicon/aluminum phosphates which can be used are also ZYT-5, ZYT-6, ZYT-7, ZYT-9, ZYT-11 and ZYT-12 in accordance with JP 59/217,619, ELAPO, ELAPSO, MeAPO, and MeAPSO. The last-mentioned molecular sieves are described, for example, by E. M. Flanigan et. al. in Aluminophosphate Molecular Sieves and the Periodic Table (Union Carbide Molecular Sieves, 1987).

Particularly preferred metal phosphates are aluminum phosphates with an AlPO structure, VPI-5 and MCM-9.

To produce the chlorofluorocarbon-free urethane-containing soft-elastic moldings, the molecular sieve which can be used according to the invention is expediently used in an amount of from 1 to 50% by weight, preferably from 2 to 20% by weight, in particular from 3 to 14% by weight, based on the weight of components (b) and, if used, (c).

The crystalline, microporous molecular sieve having a cavity diameter of less than 1.3 nm, comprising metal oxides or metal phosphates and used according to the invention as an additive (f) expediently has a particle size of from 0.5 to 200 μm, preferably from 0.8 to 20 μm, in particular from 1 to 2 μm.

In order to improve the effectiveness, it has proven advantageous to use the additives (f) in the form of a concentrate, comprising at least one crystalline, microporous molecular sieve having a cavity diameter of less than 1.3 nm to 0.3 nm and comprising metal oxides or metal phosphates, and at least one relatively high-molecular-weight compound containing at least two reactive hydrogen atoms (b), and to prepare this concentrate, for example, using a three-roll mill. In the form of the concentrate, the crystalline, microporous, molecular sieve which can be used according to the invention can easily be finely dispersed in component A, which considerably reduces the tendency toward sedimentation.

In addition to the crystalline, microporous, molecular sieve which is essential to the invention, other additives (f) and, if desired, assistants (g) can also be used to produce the urethane-containing soft-elastic moldings having a cellular core, a compacted peripheral zone and an essentially pore-free smooth surface. Specific examples are surfactants, foam stabilizers, cell regulators, lubricants, fillers, dyes, pigments, flameproofing agents, hydrolysis-protection agents, and fungistatic and bacteriostatic substances.

Examples of suitable surfactants are compounds which serve to support homogenization of the starting materials and may also regulate the cell structure. Specific examples are emulsifiers, such as the sodium salts of castor oil sulfates, or of fatty acids, and the salts of fatty acids with amines, for example diethylamine oleate, diethanolamine stearate and diethanolamine ricinoleate, salts of sulfonic acids, e.g. alkali metal salts or ammonium salts of dodecylbenzene- or dinaphthylmethanedisulfonic acid and ricinoleic acid; foam stabilizers, such as siloxane-oxyalkylene copolymers and other organopolysiloxanes, oxyethylated alkylphenols, oxyethylated fatty alcohols, paraffin oils, castor oil esters, ricinoleic acid esters, Turkey red oil and groundnut oil, and cell regulators, such as paraffins, fatty alcohols and dimethylpolysiloxanes. Suitable compounds for improving the emulsification action, the cell structure and/or stabilizing the foam are furthermore oligomeric polyacrylates containing polyoxyalkylene and fluoroalkane radicals as side groups. The surfactants are usually used in amounts of from 0.01 to 5 parts by weight, based on 100 parts by weight of component (b).

A particularly successful lubricant is a ricinoleic acid polyester having a molecular weight of from 1500 to 3500, preferably from 2000 to 3000, which is expediently employed in an amount of from 0.5 to 10% by weight, preferably from 5 to 8% by weight, based on the weight of component (b) or of components (b) and (c).

For the purposes of the invention, fillers, in particular reinforcing fillers, are conventional organic and inorganic fillers, reinforcing agents, weighting agents, agents for improving the abrasion behavior in paints, coating agents, etc. Specific examples are inorganic fillers, such as silicate minerals, for example phyllosilicates, such as antigorite, serpentine, hornblendes, amphiboles, chrysotile, and talc; metal oxides, such as kaolin, aluminum oxides, aluminum silicate, titanium oxides and iron oxides, metal salts, such as chalk, baryte and inorganic pigments, such as cadmium sulfide, zinc sulfide and glass particles. Examples of suitable organic fillers are carbon black, melamine, colophony, cyclopentadienyl resins and graft polymers.

The inorganic and organic fillers may be used individually or as mixtures and are advantageously introduced into the reaction mixture in amounts of from 0.5 to 50% by weight, preferably from 1 to 40% by weight, based on the weight of components (a) to (c).

Examples of suitable flameproofing agents are tricresyl phosphate, tris-(2-chloroethyl) phosphate, tris-(2-chloropropyl)phosphate, tris(1,3-dichloropropyl) phosphate, tris-(2,3-dibromopropyl) phosphate and tetrakis(2-chloroethyl)ethylene diphosphate.

In addition to the abovementioned halogen-substituted phosphates, it is also possible to use inorganic flameproofing agents, such as red phosphorus, expandable graphite, aluminum oxide hydrate, antimony trioxide, arsenic oxide, ammonium polyphosphate and calcium sulfate, or cyanuric acid derivatives, e.g. melamine, or mixtures of two or more flameproofing agents, e.g. expandable graphite and ammonium polyphosphate, ammonium polyphosphate and melamine, and also, if desired, starch, in order to flameproof the moldings produced according to the invention. In general, it has proven expedient to use from 2 to 50 parts by weight, preferably from 5 to 25 parts by weight, of said flameproofing agents or mixtures per 100 parts by weight of components (a) to (c).

Further details on the other conventional assistants and additives mentioned above can be obtained from the specialist literature, for example from the monograph by J. H. Saunders and K. C. Frisch, High Polymers, Volume XVI, Polyurethanes, Parts 1 and 2, Interscience Publishers 1962 and 1964 respectively, or Kunststoff-Handbuch, Polyurethane, Volume VII, Carl-Hanser-Verlag, Munich, Vienna, 1st and 2nd Editions, 1966 and 1983.

To produce the moldings, the organic modified or unmodified polyisocyanate (a), the relatively high-molecular-weight compound containing at least two reactive hydrogen atoms (b) and, if used, the low-molecular-weight chain extender and/or crosslinking agent are reacted in such amounts that the equivalence ratio between the NCO groups of the polyisocyanate (a) and the total number of reactive hydrogen atoms of component (b) and, if used, (c) is from 0.85 to 1.50:1, preferably from 0.95 to 1.15:1, in particular from 0.9 to 1.1:1.

The urethane-containing, soft-elastic moldings according to the invention can be produced by the prepolymer method or preferably by the one-shot process using the low-pressure method or the high-pressure method, in a closed, expediently heatable mold, for example a metallic mold, e.g. made of aluminum, cast iron or steel, or a mold made from a fiber-reinforced polyester or epoxy molding material However, due to the good flow properties and the improved processing properties of the formulations, the moldings are preferably produced by reaction injection molding (RIM). These procedures are described, for example, by Piechota and Rohr in Integralschaumstoff, Carl-Hanser-Verlag, Munich, Vienna, 1975; D. J. Prepelka and J. L. Wharton in Journal of Cellular Plastics, March/April 1975, pages 87 to 98, U. Knipp in Journal of Cellular Plastics, March/April 1973, pages 76 to 84 and in the Kunststoff-Handbuch, Volume 7, Polyurethane, 2nd Edition, 1983, pages 333 ff.

It has proven particularly advantageous to use the two-component method and to combine components (b), (d), (e), (f) and, if used, (c) and (g) in component (A) and to use the organic polyisocyanate, the modified polyisocyanate (a) or the mixture of said polyisocyanates and, if desired, the blowing agent (d) as component (B).

The starting components are mixed at from 15° to 80° C., preferably at from 25° to 55° C., and introduced into the closed mold, if desired at superatmospheric pressure. The mixing can be carried out mechanically by means of a stirrer or a stirring screw or under high pressure by the countercurrent injection method. The mold temperature is expediently from 20° to 120° C., preferably from 30° to 80° C., in particular from 45° to 60° C. The degree of compaction is in the range of 1.2 to 8.3, preferably from 2 to 7, in particular from 2.4 to 4.5.

The amount of reaction mixture introduced into the mold is advantageously such that the moldings obtained have an overall density of from 0.1 to 0.9 g/cm$^3$, preferably from 0.3 to 0.7 g/cm$^3$.

The urethane-containing, soft-elastic moldings having a cellular core, a compacted peripheral zone and an essentially pore-free, smooth surface and produced by the process according to the invention are used, for example, in the motor vehicle industry, for example as armrests, headrests and safety paneling in the interior of vehicles, and as bicycle and motorcycle saddles. They are furthermore suitable as shoe soles and as ski boot inners. In particular, they are used to cover metallic containers, preferably metal barrels, for alcoholic and alcohol-free drinks, e.g. beer, fruit juice, inter alia.

EXAMPLE 1

Component A: a mixture comprising 56.25 parts by weight of a glycerol-initiated polyoxypropylene (86.5% by weight)-polyoxyethylene (13.5% by weight)-polyol having an OH number of 35, 10.40 parts by weight of a glycerol-initiated polyoxypropylene (81.5% by weight)-polyoxyethylene (18.5% by weight)-polyol having an OH number of 29, 19.80 parts by weight of an ethylene diamine-initiated polyoxypropylene-polyol having an OH number of 768, 1.0 part by weight of a 33% strength by weight solution of triethylenediamine in dipropylene glycol, 0.05 part by weight of a silicone-based foam stabilizer (stabilizer OS 50 from Bayer AG), 0.1 part by weight of a dispersant (Isol ® 4R002 from ISL Chemie, Cologne), 9.9 parts by weight of a mordenite in the H form (Zeolon ® 900H), with the chemical composition $H_x[(SiO_2)_{48-x}(AlC_2)_x] \cdot y\ H_2O$, where x is from 3 to 9 and y is less than 24, and having an ellipsoidal cavity diameter of 0.65 nm × 0.7 nm, 2.0 parts by weight of a pigment paste (Isopur ® brown SA 01130/8311 from ISL-Chemie, Cologne) and 0.5 part by weight of water.

Component B

A urethane-containing quasi-prepolymer containing by weight of NCO and prepared by reacting a mixture of 55 parts by weight of 4,4'-diphenylmethane diisocyanate and 45 parts by weight of a mixture of diphenylmethane diisocyanates and polyphenylpolymethylene polyisocyanates with 9 parts by weight of a polyoxypropylene glycol having a hydroxyl number of 250.

100 parts by weight of component A and 50 parts by weight of component B were mixed at 22° C. by reaction injection molding in a Puromat ® 80/40 high-pressure metering unit from Elastogran Polyurethane GmbH, Maschinenbau, 8021 StraBlach, and introduced into a metallic mold of internal dimensions 200×200×40 mm at 40° C. in such an amount that a degree of compaction of 3.9 was produced when the mold was closed.

The molding was removed after 3.5 minutes. A soft-elastic polyurethane sheet having a cellular core, a compacted peripheral zone and a pore-free surface was obtained.

If the reaction mixture was allowed to expand in an open mold, a foam block having an overall density of 184 g/l was obtained. An initiation time of 30 seconds and a rise time of 85 seconds were measured.

COMPARATIVE EXAMPLE I

Component A: a mixture comprising 56.85 parts by weight of a glycerol-initiated polyoxypropylene (86.5% by weight)-polyoxyethylene (13.5% by weight)-polyol having an OH number of 35, 10.50 parts by weight of a glycerol-initiated polyoxypropylene (81.5% by weight)-polyoxyethylene (18.5% by weight)-polyol having an OH number of 29, 20.00 parts by weight of an ethylene diamine-initiated polyoxypropylene-polyol having an OH number of 768, 1.0 part by weight of a 33% strength by weight solution of triethylenediamine in dipropylene glycol, 0.05 part by weight of a silicone-based foam stabilizer (stabilizer OS 50 from Bayer AG), 0.1 part by weight of a dispersant (Isol ® 4R002 from ISL Chemie, Cologne), 9.5 parts by weight of trichlorofluoromethane and 2.0 parts by weight of a pigment paste (Isopur ® brown SA 01130/8311 from ISL-Chemie, Cologne).

Component B: as in Example 1

100 parts by weight of component A and 50 parts by weight of component B were allowed to expand by a method similar to that of Example 1 in the same mold, but at a degree of compaction of 3.6.

The molding was removed after 4 minutes. A soft-elastic polyurethane sheet having a cellular core, a compacted peripheral zone, a compact, pore-free surface and a Shore A hardness of 98 was obtained.

If the reaction mixture was foamed in an open mold, a foam block having an overall density of 185 g/l was obtained. An initiation time of 30 seconds and a rise time of 92 seconds were measured.

The structural foam moldings produced in Example 1 and Comparative Example I have a high impact resilience and are used, for example, to cover aluminum barrels in the drinks industry, in particular for covering beer barrels.

EXAMPLE 2

Component A: a mixture comprising 56.90 parts by weight of a glycerol-initiated polyoxypropylene (81.5% by weight)-polyoxyethylene (18.5% by weight)-polyol having a hydroxyl number of 29, 25.45 parts by weight of a graft polyether-polyol having a hydroxyl number of 28 and prepared from a glycerol-initiated polyoxypropylenepolyoxyethylene-polyol as the graft base and a mixture of styrene and acrylonitrile in the weight ratio 12:8 as the graft (Polyurax ® U26-03 from BP, Germany), 6.50 parts by weight of ethylene glycol, 1.20 parts by weight of a 25% strength by weight solution of triethylenediamine in 1,4-butanediol, 0.10 part by weight of a 33% strength by weight solution of triethylenediamine in ethylene glycol, 0.95 part by weight of water and 8.90 parts by weight of a mordenite in the H form (Zeolon ®900H from Norton, USA)

Component B: as in Example 1

100 parts by weight of component A and 45 parts by weight of component B were reacted by a method similar to that of Example 1, but allowed to expand at a degree of compaction of 2.4.

The molding was removed after 4 minutes. A soft-elastic polyurethane sheet having a cellular core, a compacted peripheral zone, a compact, pore-free surface and a Shore A hardness of 65 was obtained.

If the reaction mixture was allowed to expand in an open mold, a foam block having an overall density of 167 g/l was obtained. An initiation time of 22 seconds and a rise time of 65 seconds were measured.

COMPARATIVE EXAMPLE II

Component A: a mixture comprising 56.70 parts by weight of a glycerol-initiated polyoxypropylene (81.5% by weight)-polyoxyethylene (18.5% by weight)-polyol having a hydroxyl number of 29, 22.97 parts by weight of a graft polyether-polyol having a hydroxyl number of 28 and prepared from a glycerol-initiated polyoxypropylenepolyoxyethylene-polyol as the graft base and a mixture of styrene and acrylonitrile in the weight ratio 12:8 as the graft (Polyurax ® U26-03 from BP, Germany), 6.40 parts by weight of ethylene glycol, 1.13 parts by weight of a 25% strength by weight solution of triethylenediamine in 1,4-butanediol, 0.10 part by weight of a 33% strength by weight solution of triethylenediamine in ethylene glycol, 0.20 part by weight of a dispersant (Isol ®HR 002 from ISL-Chemie, Cologne) and 12.5 parts by weight of trichlorofluoromethane.

Component B: as in Example 1

100 parts by weight of component A and 45 parts by weight of component B were reacted by a method similar to that of Example 1 and allowed to expand in the same mold, but at a degree of compaction of 3.2.

The molding was removed after 4 minutes. A soft-elastic polyurethane sheet having a cellular core, a compacted peripheral zone, a compact, pore-free surface and a Shore A hardness of 70 was obtained.

If the reaction mixture was allowed to expand in an open mold, a foam block having an overall density of 125 g/l was obtained. An initiation time of 20 seconds and a rise time of 65 seconds were measured.

The soft-elastic structural foam moldings produced in Example 2 and Comparative Example II preferably have an overall density of from 300 to 700 g/l and a Shore A hardness of from 40 to 80. The products are used, for example, in the automotive, furniture, sports and leisure industries, for example as armrests, neck supports, steering wheels, seat cushions, puppet bodies, handles and paneling elements.

EXAMPLE 3

Component A: a mixture comprising 47.10 parts by weight of a glycerol-initiated polyoxypropylene (81.5% by weight)-polyoxyethylene (18.5% by weight)-polyol having a hydroxyl number of 29, 14.50 parts by weight of a trimethylolpropane-initiated polyoxypropylene(80% by weight)-polyoxyethylene(20% by weight)-polyol having a hydroxyl number of 27, 18.10 parts by weight of a glycerol-initiated polyoxypropylene (86.5% by weight)-polyoxyethylene(13.5% by weight)-polyol having a hydroxyl number of 35, 9.95 parts by weight of 1,4-butanediol, 1.23 parts by weight of a 25% strength by weight solution of triethylenediamine in 1,4-butanediol, 0.02 part by weight of dibutyltin dilaurate and 9.10 parts by weight of a mordenite in the H form (Zeolon ® 900 H from Norton, USA).

Component B:

A urethane-containing quasi-prepolymer containing 23% by weight of NCO and prepared by reacting 4,4'-diphenylmethane diisocyanate with a mixture of dipropylene glycol and a polyoxypropylene glycol having a hydroxyl number of 250.

100 parts by weight of component A and 50 parts by weight of component B were mixed at 22° C. by reaction injection molding in a Puromat ® 80/40 high-pressure metering unit from Elastogran Polyurethane GmbH, Maschinenbau, 8021 StraBlach, and introduced into a metallic mold of internal dimensions 200×200×40 mm at 40° C. in such an amount that a degree of compaction of 1.2 was produced when the mold was closed.

The molding was removed after 3.5 minutes. A soft-elastic polyurethane sheet having a cellular core, a compacted peripheral zone and a pore-free surface was obtained.

If the reaction mixture was allowed to expand in an open mold, a foam block having an overall density of 352 g/l was obtained. An initiation time of 24 seconds and a rise time of 58 seconds were measured.

EXAMPLE 4

46.68 parts by weight of a glycerol-initiated polyoxypropylene (81.5% by weight)-polyoxyethylene(18.5% by weight)-polyol having a hydroxyl number of 29, 14.50 parts by weight of a trimethylolpropane-initiated polyoxypropylene(80% by weight)-polyoxyethylene(20% by weight)-polyol having a hydroxyl number of 27, 18.00 parts by weight of a glycerol-initiated polyoxypropylene(86.5% by weight)-polyoxyethylene(13.5% by weight)-polyol having a hydroxyl number of 35, 9.90 parts by weight of 1,4-butanediol, 1.30 parts by weight of a 25% strength by weight solution of triethylenediamine in 1,4-butanediol, 0.02 part by weight of dibutyltin dilaurate, 9.00 parts by weight of a mordenite in the H form (Zeolon ® 900 H from Norton, USA) and 0.60 part by weight of water.

Component B: as in Example 3

100 parts by weight of component A and 55 parts by weight of component B were mixed at 22° C. by reaction injection molding in a Puromat ® 80/40 high-pressure metering unit from Elastogran Polyurethane GmbH, Maschinenbau, 8021 StraBlach, and introduced into a metallic mold of internal dimensions 200×200×40 mm at 40° C. in such an amount that a degree of compaction of 2.4 was produced when the mold was closed.

The molding was removed after 3.5 minutes. A soft-elastic polyurethane sheet having a cellular core, a compacted peripheral zone, a pore-free surface and a Shore A hardness of 65 was obtained.

If the reaction mixture was allowed to expand in an open mold, a foam block having an overall density of 360 g/l was obtained. An initiation time of 23 seconds and a rise time of 61 seconds were measured.

EXAMPLE 5

Component A: a mixture comprising 46.58 parts by weight of a glycerol-initiated polyoxypropylene (81.5% by weight)-polyoxyethylene(18.5% by weight)-polyol having a hydroxyl number of 29, 14.40 parts by weight of a trimethylolpropane-initiated polyoxypropylene(80% by weight)-polyoxyethylene(20% by weight)-polyol having a hydroxyl number of 27, 17.95 parts by weight of a glycerol-initiated polyoxypropylene(86.5% by weight)-polyoxyethylene(13.5% by weight)-polyol having a hydroxyl number of 35, 1.30 parts by weight of a 25% strength by weight solution of triethylenediamine in 1,4-butanediol, 0.02 part by weight of dibutyltin dilaurate, 9.00 parts by weight of a mordenite in the H form (Zeolon ® 900 H from Norton, USA) and 0.90 part by weight of water.

Component B: as in Example 3

100 parts by weight of component A and 60 parts by weight of component B were mixed as in Example 3 and allowed to expand in the same mold, but at a degree of The molding was removed after 4 minutes. A soft-elastic polyurethane sheet having a cellular core, a compacted peripheral zone, a compact, pore-free surface and a Shore A hardness of 50 was obtained.

If the reaction mixture was allowed to expand in an open mold, a foam block having an overall density of 125 g/l was obtained. An initiation time of 22 seconds and a rise time of 68 seconds were measured

COMPARATIVE EXAMPLE III

Component A: a mixture comprising 44.00 parts by weight of a glycerol-initiated polyoxypropylene (81.5% by weight)-polyoxyethylene(18.5% by weight)-polyol having a hydroxyl number of 29, 13.60 parts by weight of a trimethylolpropane-initiated polyoxypropylene(80% by weight)polyoxyethylene-(20% by weight)-polyol having a hydroxyl number of 27, 17.00 parts by weight of a glycerol-initiated polyoxypropylene(86.5% by weight)-polyoxyethylene(13.5% by weight)-polyol having a hydroxyl number of 35, 9.30 parts by weight of 1,4-butanediol, 1.23 parts by weight of a 25% strength by weight solution of triethylenediamine in 1,4-butanediol, 0.02 part by weight of dibutyltin dilaurate, 6.80 parts by weight of Black Paste N from Bayer AG and 8.05 parts by weight of trichlorofluoromethane.

Component B: as in Example 3

100 parts by weight of component A and 50 parts by weight of component B were mixed as in Example 3 and allowed to expand in the same mold, but at a degree of compaction of 3.1.

The molding was removed after 4 minutes. A soft-elastic polyurethane sheet having a cellular core, a compacted peripheral zone, a compact, pore-free surface and a Shore A hardness of 86 was obtained.

If the reaction mixture was allowed to expand in an open mold, a foam block having an overall density of 190 g/l was obtained. An initiation time of 18 seconds and a rise time of 50 seconds were measured.

The soft-elastic structural foam moldings produced in Examples 3 to 5 and Comparative Example III preferably have an overall density of from 500 to 900 g/l and a Shore A hardness of from 70 to 90. The products have very good mechanical properties and are extremely stable to the effects of weathering. They are therefore preferably used in the automotive industry, for example for fender guards. spoilers, bump-protection strips, gaiters or gear rims.

EXAMPLE 6

Component A: a mixture comprising 8.50 parts by weight of a mixture comprising 85 parts by weight of a glycerol-initiated polyoxypropylene (86% by weight)-polyoxyethylene (14% by weight)-polyol having a hydroxyl number of 35 and 15 parts by weight of a synthetic silicate (Transpafill from Degussa AG, Frankfurt), 56.30 parts by weight of a glycerol-initiated polyoxypropylene (81.5% by weight)-polyoxyethylene(18.5% by weight)-polyol having a hydroxyl number of 29, 17.17 parts by weight of a trimethylolpropane-initiated polyoxypropylene(80% by weight)-polyoxyethylene(20% by weight)-polyol having a hydroxyl number of 27, 6.12 parts by weight of 1,4-butanediol, 0.42 part by weight of ethylene glycol, 0.20 part by weight of silicone stabilizer DC 193, 0.78 part by weight of water, 1.44 parts by weight of a 25% strength by weight solution of triethylenediamine in 1,4-butanediol, 0.03 part by weight of dibutyltin dilaurate and 9.04 parts by weight of a mordenite in the H form (Zeolon ® 900 H from Norton, USA).

Component B: as in Example 3

100 parts by weight of component A and 55 parts by weight of component B were mixed as in Example 3 and allowed to expand in the same mold, but at a degree of compaction of 1.7.

The molding was removed after 3.5 minutes. soft-elastic polyurethane sheet having a cellular core. a compacted peripheral zone, a compact, pore-free surface and a Shore A hardness of 35 was obtained.

If the reaction mixture was allowed to expand in an open mold, a foam block having an overall density of 125 g/l was obtained. An initiation time of 19 seconds and a rise time of 75 seconds were measured.

COMPARATIVE EXAMPLE IV

Component A: a mixture comprising 8.80 parts by weight of a mixture comprising 85 parts by weight of a glycerol-initiated polyoxypropylene (86% by weight)-polyoxyethylene (14% by weight)-polyol having a hydroxyl number of 35 and 15 parts by weight of a synthetic silicate (Transpafill ® from Degussa AG, Frankfurt), 58.34 parts by weight of a glycerol-initiated polyoxypropylene (81.5% by weight)-polyoxyethylene(18.5% by weight)-polyol having a hydroxyl number of 29, 17.80 parts by weight of a time thylolpropane-initiated polyoxypropylene(80% by weight)polyoxyethylene(20% by weight)-polyol having a hydroxyl number of 27, 6.35 parts by weight of 1,4-butanediol, 0.43 part by weight of ethylene glycol, 0.20 part by weight of silicone stabilizer DC 193, 0.15 part by weight of water, 1.50 part by weight of a 25% strength by weight solution of triethylenediamine in 1,4-butanediol, 0.03 part by weight of dibutyltin dilaurate and 6.44 parts by weight of a trichlorofluoromethane.

Component B: as in Example 3

100 parts by weight of component A and 52.7 parts by weight of component B were mixed as in Example 3 and allowed to expand in the same mold. but at a degree of compaction of 3.6.

The molding was removed after 3.5 minutes. A soft-elastic polyurethane sheet having a cellular core, a compacted peripheral zone, a compact, pore-free surface and a Shore A hardness of 40 was obtained.

If the reaction mixture was allowed to expand in an open mold, a foam block having an overall density of 195 g/l was obtained. An initiation time of 15 seconds and a rise time of 50 seconds were measured.

EXAMPLE 7

Component A: a mixture comprising 79.75 parts by weight of an ethylene glycol 1,4-butanediol polyadipate having a hydroxyl number of 56, 7.65 parts by weight of an ethylene glycol, 1.15 parts by weight of a 33% strength by weight solution of triethylenediamine in ethylene glycol, 0.20 part by weight of glycerol (99.5% by weight), 0.30 part by weight of triethanolamine, 0.25 part by weight of silicone foam stabilizer OS 710, 0.70 part by weight of water and 10.00 parts by weight of a mordenite in the H form (Zeolon ® 900 H from Norton, USA)

Component B: as in Example 3

100 parts by weight of component A and 78.5 parts by weight of component B were mixed as in Example 3 and allowed to expand in the same mold, but at a degree of compaction of 3.

The molding was removed after 5 minutes. A soft-elastic polyurethane sheet having a cellular core, a compacted peripheral zone, a compact, pore-free surface and a Shore A hardness of 90 was obtained.

If the reaction mixture was allowed to expand in an open mold, a foam block having an overall density of 140 g/l was obtained. In the foaming reaction, an initiation time of 24 seconds and a rise time of 70 seconds were measured.

COMPARATIVE EXAMPLE V

Component A: a mixture comprising 88.90 parts by weight of an ethylene glycol 1,4-butanediol polyadipate having a hydroxyl number of 56, 8.50 parts by weight of an ethylene glycol, 1.15 parts by weight of a 33% strength by weight solution of triethylenediamine in ethylene glycol, 0.20 part by weight of glycerol (99.5% by weight), 0.30 part by weight of triethanolamine, 0.25 part by weight of silicone foam stabilizer OS 710, and 0.70 part by weight of water.

Component B: as in Example 3

100 parts by weight of component A and 78.5 parts by weight of component B were mixed as in Example 3 and allowed to expand in the same mold, but at a degree of compaction of 2.4.

The molding was removed after 5 minutes. A soft-elastic polyurethane sheet having a cellular core, a compacted peripheral zone, a compact, pore-free surface and a Shore A hardness of 75 was obtained.

If the reaction mixture was allowed to expand in an open mold, a foam block having an overall density of 185 g/l was obtained. In the foaming reaction, an initiation time of 24 seconds and a rise time of 70 seconds were measured.

The structural polyurethane foam moldings produced in Examples 6 and 7 and Comparative Examples IV and V are preferably used as shoe soles.

EXAMPLE 8

Component A: a mixture comprising 43.28 parts by weight of a glycerol-initiated polyoxypropylene (86.5% by weight)-polyoxyethylene (13.5% by weight)-polyol having a hydroxyl number of 35, 24.15 parts by weight of a graft polyether-polyol having a hydroxyl number of 28 and prepared from a glycerol-initiated polyoxypropylenepolyoxyethylene-polyol as the graft base and a mixture of styrene and acrylonitrile in the weight ratio 12:8 as the graft (Polyurax U 26-03 from BP, Germany), 9.66 parts by weight of a trimethylolpropane-initiated polyoxypropylene(80% by weight)-polyoxyethylene(20% by weight)-polyol having a hydroxyl number of 27, 0.77 part by weight of a 33% by weight solution of triethylenediamine in ethylene glycol, 0.58 part by weight of glycerol (99.5% by weight), 5.31 parts by weight of ethylene glycol, 0.04 part by weight of a silicone-based stabilizer (Tegostab ® B2219 from Goldschmidt AG, Essen), 5.80 parts by weight of Black Paste N from Bayer AG, 0.52 part by weight of water and 9.82 parts by weight of a mordenite in the H form (Zeolon ® 900 H from Norton, USA).

Component B

A mixture comprising 70 parts by weight of urethane-containing quasi-prepolymer containing 23% by weight of NCO and prepared by reacting 4,4'-diphenylethane diisocyanate with a mixture of dipropylene glycol and a polyoxypropylene glycol having a hydroxyl number of 250, and 30 parts by weight of a urethane-containing quasi-prepolymer containing 28% by weight of NCO and prepared by reacting a mixture of 55 parts by weight of 4,4'-diphenylmethane diisocyanate and 45 parts by weight of a mixture of diphenylmethane diisocyanates and polyphenyl polymethylene polyisocyanates with 9 parts by weight of a polyoxypropylene glycol having a hydroxyl number of 250.

100 parts by weight of component A and 39.5 parts by weight of component B were mixed at 22° C. by reaction injection molding in a Puromat ® 80/40 high-pressure metering unit from Elastogran Polyurethane GmbH, Maschinenbau, 8021 StraBlach, and introduced into a metallic mold in the shape of an automobile steering wheel at 45° C. in such an amount that a degree of compaction of 4 was produced on expansion.

The molding was removed after 3.5 minutes and had a cellular core, a compacted peripheral zone, a compact, pore-free surface and a Shore A hardness of 72.

If the reaction mixture was allowed to expand in an open mold, a foam block having an overall density of 185 g/l was obtained. In the foaming reaction, an initiation time of 17 seconds and a rise time of 68 seconds were measured.

EXAMPLE 9

The procedure was similar to that of Example 5, but the mordenite in the H form (Zeolon ® 900 H) was replaced by a ZSM-12 saturated with 7% by weight of n-hexane and having a cavity diameter of 0.62×0.57×0.55 nm, and prepared by treating calcined ZSM-12 with n-hexane under reflux.

The structural polyurethane foam sheet produced had a cellular core, a compacted peripheral zone and a compact, pore-free surface.

EXAMPLE 10

Component A: a mixture comprising 55.7 parts by weight of a glycerol-initiated polyoxypropylene (81.5% by weight)-polyoxyethylene (19.5% by weight)-polyol having a hydroxyl number of 29, 25.77 parts by weight of a graft polyether-polyol having a hydroxyl number of 28 and prepared from a glycerol-initiated polyoxypropylenepolyoxyethylene-polyol as the graft base and a mixture of styrene and acrylonitrile in the weight ratio 12:8 as the graft (Polyurax ® U26-03 from BP, Germany), 6.4 parts by weight of ethylene glycol, 0.83 part by weight of a 25% strength by weight solution of triethylenediamine in 1,4-butanediol, party by weight of a 33% strength by weight solution of triethylenediamine in ethylene glycol, 0.2 part by weight of additive SM from Bayer Ag, 1.0 part by weight of water and 10 parts by weight of silicon/aluminum phosphate-5 (SAPO-5).

Component B: as in Example 8

100 parts by weight of component A and 63.11 parts by weight of component B were mixed by a method similar to that of Example 3 and allowed to expand in the same mold at a degree of compaction of 2.4.

The molding was removed after 3.5 minutes. A soft-elastic polyurethane sheet having a cellular core, a compacted peripheral zone, a compact, pore-free surface and a Shore A hardness of 65.7 was obtained.

If the reaction mixture was allowed to expand in an open mold, a foam block having an overall density of 158 g/l was obtained. In the foaming reaction, an initiation time of 31 seconds and a rise time of 95 seconds were

EXAMPLE 11

Component A: as in Example 10, but with addition of 10 parts by weight of clinoptilolite (Zeolon ® 700 from Norton, USA) having a cavity diameter of 0.76 to 0.3 nm instead of the silicon/aluminum phosphate-5 (SAPO-5).

Component B: as in Example 8

100 parts by weight of component and 63.11 parts by weight of component B were mixed by a method similar to that of Example 3 and allowed to expand in the same mold at a degree of compaction of 2.4.

The molding was removed after 3.5 minutes. A soft-elastic polyurethane sheet having a cellular core, a compacted peripheral zone, a compact, pore-free surface and a Shore A hardness of 65.7 was obtained.

If the reaction mixture was allowed to expand in an open mold, a foam block having an overall density of 156 g/l was obtained. In the foaming reaction, an initiation time of 28 seconds and a rise time of 90 seconds were measured.

EXAMPLE 12

Component A: a mixture comprising 58.10 parts by weight of a glycerol-initiated polyoxypropylene (86.5% by weight)-polyoxyethylene(13.5% by weight)-polyol having an OH number of 35, 10.50 parts by weight of a glycerol-initiated polyoxypropylene (81.5% by weight)-polyoxyethylene-(18.5% by weight)-polyol having an OH number of 29, 20.0 parts by weight of an ethylenediamine-initiated polyoxypropylene-polyol having an OH number of 768, 0.6 part by weight of a 33% strength by weight solution of triethylenediamine in a dipropylene glycol, 0.1 part by weight of a silicone-based foam stabilizer (stabilizer OS 710 from Bayer AG), 0.1 part by weight of a foam stabilizer based on sulfated castor oil (stabilizer SM from Bayer AG), 0.6 part by weight of water and 10.0 parts by weight of a mordenite in the $NH_4\oplus$ form, prepared by ion exchange of the mordenite in the H form (Zeolon ® 900 H from Norton, USA) using $NH_4NO_3$.

Component B: as in Example 1

100 parts by weight of component A and 58.85 parts by weight of component B were mixed at 22° C. by reaction injection molding in a Puromat ® 80/40 high-pressure metering unit from Elastogran Polyurethane GmbH, Maschinenbau, 8021 StraBlach, and introduced into a metallic mold of internal dimensions 200×200×40 mm at 40° C. in such an amount that a degree of compaction of 3.4 was produced when the mold was closed.

The molding was removed after 3.5 minutes. A soft-elastic polyurethane sheet having a cellular core, a compacted peripheral zone, a pore-free surface and a Shore A hardness of 94.5 was obtained.

If the reaction mixture was allowed to expand in an open mold, a foam block having an overall density of 153.2 g/l was obtained. An initiation time of 23 seconds and a rise time of 101 seconds were measured.

EXAMPLE 13

Component A

A mixture as in Example 12, but with the mordenite in the ammonium form replaced by an ultrastable Y zeolite (USY-zeolite) having an $SiO_2:Al_2O_3$ ratio of 53 and prepared by dealumination using steam. Molecular sieves of this type are described, for example, in U.S. Pat. No. 4,512,961.

Component B: as in Example 1

The molding was produced by a method similar to that of Example 12, but with a degree of compaction of 3.5. A polyurethane sheet having a Shore A hardness of 95.5 and a compact, pore-free surface was obtained.

If the reaction mixture was allowed to expand in pen mold, a foam block having an overall density of 151.2 g/l was obtained. An initiation time of 23 seconds and a rise time of 100 seconds were measured.

EXAMPLE 14

Component A

A mixture as in Example 12, but with the mordenite in the ammonium form replaced by an H form silicalite calcined at 500° having an $SiO_2:Al_2O_3$ molar ratio of 527 and an Na content of 0.03% by weight. Silicalites of this type are described in U.S. Pat. No. 4,061,724.

Furthermore, the amount of water present in component A was 0.75 part by weight.

Component B: as in Example 1

The molding was produced by a method similar to that of Example 12, but with a degree of compaction of 3.3. A polyurethane sheet having a Shore A hardness of 95 and a compact, pore-free surface was obtained.

If the reaction mixture was allowed to expand in an open mold, a foam block having an overall density of 159 g/l was obtained. In the foaming reaction, an initiation time of 25 seconds and a rise time of 93 seconds were measured.

EXAMPLE 15

Component A

A mixture as in Example 12, but with the mordenite in the ammonium form replaced by an Na form silicalite calcined at 500° having an $SiO_2:Al_2O_3$ molar ratio of 37,000 and an Na:Al molar ratio of 1500. Silicalites of this type are described in U.S. Pat. No. 4,061,724.

Furthermore, the amount of water present in component A was 0.75 part by weight.

Component B: as in Example 1

The molding was produced by a method similar to that of Example 12, but with a degree of compaction of 3.4. A polyurethane sheet having a Shore A hardness of 96 and a compact, pore-free surface was obtained.

If the reaction mixture was allowed to expand in an open mold, a foam block having an overall density of 157.4 g/l was obtained. In the foaming reaction, an initiation time of 22 seconds and a rise time of 89 seconds were measured at 23° C.

EXAMPLE 16

Component A

A mixture as in Example 12, but with the mordenite in the ammonium form replaced by an H form ZSM-5 calcined at 500° C. Calcined ZSM-5 of this type is described in U.S. Pat. No. 3,702,886.

Furthermore, the amount of water present in component A was 0.45 part by weight.

Component B: as in Example 1

The molding was produced by a method similar to that of example 12, but with a degree of compaction of 3.3. A polyurethane sheet having a Shore A hardness of 94 and a compact, pore-free surface was obtained.

If the reaction mixture was allowed to expand in an open mold, a foam block having an overall density of 160 g/l was obtained. In the foaming reaction, an initiation time of 23 seconds and a rise time of 82 seconds were measured at 23° C.

EXAMPLE 17

Component A

A mixture as in Example 12, but with the mordenite in the ammonium form replaced by an Na form ZSM-5 calcined at 500° C. Calcined ZSM-5 of this type is described in U.S. Pat. No. 3,702,886.

Furthermore, the amount of water present in component A was 0.95 part by weight.

Component B: as in Example 1

The molding was produced by a method similar to that of Example 12, but with a degree of compaction of 3.3. A polyurethane sheet having a Shore A hardness of 94 and a compact, pore-free surface was obtained.

If the reaction mixture was allowed to expand in an open mold, a foam block having an overall density of 160 g/l was obtained. In the foaming reaction, an initiation time of 29 seconds and a rise time of 92 seconds were measured at 23° C.

EXAMPLE 18

Component A

A mixture as in Example 12, but with the mordenite in the ammonium form replaced by a SAPO-11. SAPO-11 of this type is described in EP-A-251 168, page 90.

Furthermore, the amount of water present in component A was 0.6 part by weight.

Component B: as in Example 1

The molding was produced by a method similar to that of Example 12, but with a degree of compaction of 3.3. A polyurethane sheet having a Shore A hardness of 93 and a compact, pore-free surface was obtained.

If the reaction mixture was allowed to expand in an open mold, a foam block having an overall density of 159 g/l was obtained. In the foaming reaction, an initiation time of 24 seconds and a rise time of 89 seconds were measured at 23° C.

EXAMPLE 19

Component A

A mixture as in Example 12, but with the mordenite in the ammonium form replaced by ferrierite (Zeolon ® 500 from Norton, USA).

Furthermore, the amount of water present in component A was 0.6 part by weight.

Component B: as in Example 1

The molding was produced by a method similar to that of Example 12, but with a degree of compaction of 3.1. A polyurethane sheet having a Shore A hardness of 89 and a compact, pore-free surface was obtained.

If the reaction mixture was allowed to expand in an open mold, a foam block having an overall density of 167 g/l was obtained. In the foaming reaction, an initiation time of 25 seconds and a rise time of 86 seconds were measured at 23° C.

EXAMPLE 20

Component A

A mixture as in Example 12, but with the mordenite in the ammonium form replaced by AlPO$_4$-5.

To prepare AlPO$_4$-5, 200 g of 98% strength by weight phosphoric acid and 136 g of boehmite were partially dissolved and suspended in 335 g of water. 678 g of a 30% strength by weight aqueous tetrapropylammonium hydroxide solution were added to this suspension, and the mixture was reacted for 43 hours at 150° C. in a stirred autoclave under autogenous pressure. The crystalline product formed was filtered off, dried at 120° C. and calcined for 16 hours at 500° C. The AlPO$_4$-5 prepared in this way contained 45.5% by weight of Al$_2$O$_3$ and 46.5% by weight of P$_2$O$_5$.

Furthermore, the amount of water present in component A was 1.0 part by weight.

Component B: as in Example 1

The molding was produced by a method similar to that of Example 23, but with a degree of compaction of 3.2. A polyurethane sheet having a Shore A hardness of 94 and a compact, pore-free surface was obtained.

If the reaction mixture was allowed to expand in an open mold, a foam block having an overall density of 165 g/l was obtained. In the foaming reaction, an initiation time of 24 seconds and a rise time of 85 seconds were measured at 23° C.

EXAMPLE 21

Component A

A mixture as in Example 12, but with the mordenite in the ammonium form replaced by a borosilicate zeolite in the H form having a pentasil structure.

The borosilicate zeolite having a pentasil structure was prepared in a hydrothermal synthesis by reacting 640 g of highly dispersed silicon dioxide, 122 g of boric acid and 8 kg of an aqueous 50% strength by weight 1,6-hexanediamine solution at 170° C. in a stirred autoclave under autogenous pressure. The crystalline reaction product formed was filtered off, washed with water, dried at 100° C. for 24 hours and then calcined at 500° C. for 24 hours. The borosilicate zeolite prepared in this way contained 94.2% by weight of SiO$_2$ and 2.3% by weight of B$_2$O$_3$.

Furthermore, the amount of water present in component A was 0.3 part by weight.

Component B: as in Example 1

The molding was produced by a method similar to that of Example 12, but with a degree of compaction of 3.3. A polyurethane sheet having a Shore A hardness of 94 and a compact, pore-free surface was obtained.

If the reaction mixture was allowed to expand in an open mold, a foam block having an overall density of 160 g/l was obtained. In the foaming reaction, an initiation time of 24 seconds and a rise time of 92 seconds were measured at 23° C.

EXAMPLE 22

Component A

A mixture as in Example 12, but with the mordenite in the ammonium form replaced by an ultrastable Y zeolite whose SiO$_2$:A$_2$O$_3$ ratio was adjusted to 5 by treatment with steam by a known method.

Furthermore, the amount of water present in component A was 1.0 part by weight.

Component B: as in Example 1

The molding was produced by a method similar to that of Example 12, but with a degree of compaction of 3.4. A polyurethane sheet having a Shore A hardness of 95 and a compact, pore-free surface was obtained.

If the reaction mixture was allowed to expand in an open mold, a foam block having an overall density of 156 g/l was obtained. In the foaming reaction, an initiation time of 23 seconds and a rise time of 92 seconds were measured at 23° C.

We claim:

1. A process for the production of chlorofluoro-carbon-free urethane-containing soft-elastic moldings having a cellular core and a compacted peripheral zone, by reacting
   a) an organic and/or modified organic polyisocyanate with
   b) at least one relatively high-molecular-weight compound containing at least two reactive hydrogen atoms and, optionally,
   c) a low-molecular-weight chain extender and/or crosslinking agent,
   in the presence of
   d) a blowing agent,
   e) a catalyst,
   f) additives and, optionally,
   g) assistants,
   in a closed mold with compaction, wherein the additive (f) used is a crystalline, microporous molecular sieve having a cavity and cavity mouth diameter of less than 1.3 nm and comprising metal oxides or metal phosphates.

2. A process as claimed in claim 1, wherein the metal oxides or metal phosphates are selected from the group consisting of the oxides or phosphates of aluminum, boron, iron, chromium, vanadium, beryllium, antimony, arsenic, gallium, silicon, germanium, titanium, zirconium and hafnium.

3. A process as claimed in claim 1, wherein the metal oxides are mixed oxides essentially comprising aluminum/silicon oxide, boron/silicon oxide, iron/silicon oxide, gallium/silicon oxide, chromium/silicon oxide, beryllium/silicon oxide, vanadium/silicon oxide, antimony/silicon oxide, arsenic/silicon oxide, titanium/silicon oxide, aluminum/germanium oxide and boron/germanium oxide.

4. A process as claimed in claim 1, wherein the metal oxide comprises a silicon dioxide with a pentasil structure.

5. A process as claimed in claim 1, wherein the metal oxides used are zeolites which have a pentasil, faujasite, mordenite, erionite, chabazite or offretite structure.

6. A process as claimed in claim 1, wherein the metal oxides are aluminum silicate zeolites, boron silicate zeolites, iron silicate zeolites or gallium silicate zeolites having a pentasil structure.

7. A process as claimed in claim 1, wherein the metal oxide is a titanium silicate having a pentasil structure.

8. A process as claimed in claim 1, wherein the metal oxides used are zeolites having a cavity and cavity mouth diameter of from 0.74 to 0.41 nm.

9. A process as claimed in claim 1, wherein the metal oxides used are zeolites having an $SiO_2/Al_2O_3$ ratio greater than or equal to 6.

10. A process as claimed in claim 1, wherein the metal oxides used are: mordenite in the H form, Na form or ammonium form, offretite in the H form, K form, Na form or ammonium form, zeolite ZSM-5 in the H form, Na form or ammonium form, zeolite ZSM-11, zeolite ZSM-12, beta-zeolite, clinoptilolite, ferrierite, ultrastable Y-zeolite, ultrastable mordenite or a silicalite, or a mixture of at least 2 of said zeolites.

11. A process as claimed in claim 1, wherein the metal phosphates used are substituted or unsubstituted aluminum phosphates or silicon/aluminum phosphates.

12. A process as claimed in claim 1, wherein the aluminum phosphates or silicon/aluminum phosphates which can be used as the metal phosphates additionally contain the elements lithium, beryllium, boron, magnesium, gallium, germanium, arsenic, titanium, manganese, iron, cobalt or zinc.

13. A process as claimed in claim 1, wherein the metal phosphates are selected from the group consisting of $AlPO_4$, SAPO, ELAPO, ELAPSO, MeAPO and MeAPSO.

14. A process as claimed in claim 1, wherein the metal phosphates used are: aluminum phosphates with an $AlPO_4$ structure, VPI-5 or MCM-9.

15. A process as claimed in claim 1, wherein the crystalline, microporous molecular sieve having a cavity and cavity mouth diameter of less than 1.3 nm comprises metal oxides or metal phosphates in an amount of from 1 to 50% by weight, based on the weight of components (b) and, if used, (c).

16. A process as claimed in claim 1, wherein the relatively high-molecular-weight compound containing at least two reactive hydrogen atoms (b) or the mixture of (b) and a low-molecular-weight chain extender and/or crosslinking agent (c) has a hydroxyl number of less than 300 mg of KOH/g.

17. A process as claimed in claim 1, wherein the crystalline, microporous molecular sieve having a cavity and cavity mouth diameter of less than 1.3 nm comprises metal oxides or metal phosphates in combination with additional water and/or a physical blowing agent, with the exception of chlorofluorocarbons, as the blowing agent (d).

18. A process as claimed in claim 1, wherein the additive (f) is used in the form of a concentrate, comprising at least one crystalline, microporous molecular sieve which has a cavity and cavity mouth diameter of from less than 1.3 nm to 0.3 nm and comprises metal oxides or metal phosphates, and at least one relatively high-molecular-weight compound containing at least two reactive hydrogen atoms (b).

19. A process as claimed in claim 1, wherein the urethane-containing soft-elastic moldings are produced by reaction injection molding.

* * * * *